(No Model.) 2 Sheets—Sheet 1.
Z. BREED.
SULKY CULTIVATOR AND WEEDER.
No. 473,289. Patented Apr. 19, 1892.
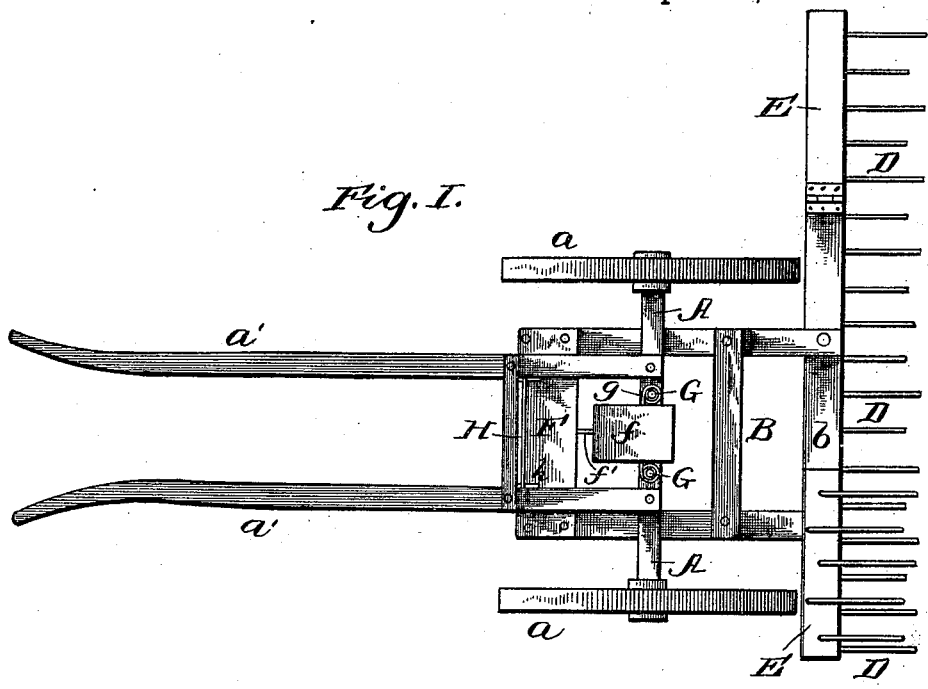
Fig. I.
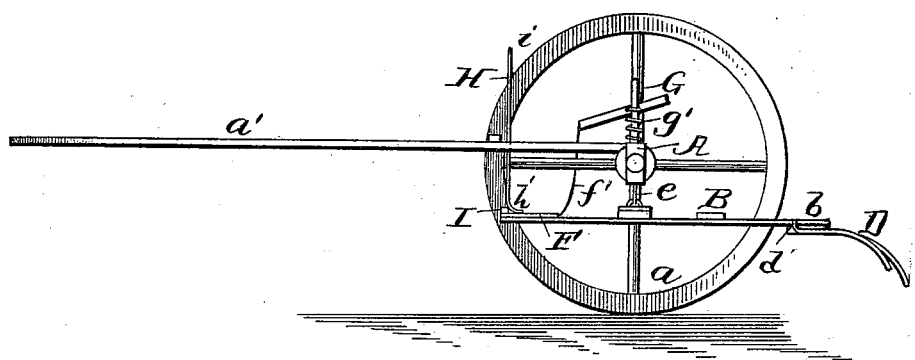
Fig. II.
Witnesses:
J. B. McGirr.
William O. Belt.
Inventor.
Zephaniah Breed
By his attorneys (No Model.) 2 Sheets—Sheet 2.
Z. BREED.
SULKY CULTIVATOR AND WEEDER.
No. 473,289. Patented Apr. 19, 1892.
Fig. III.
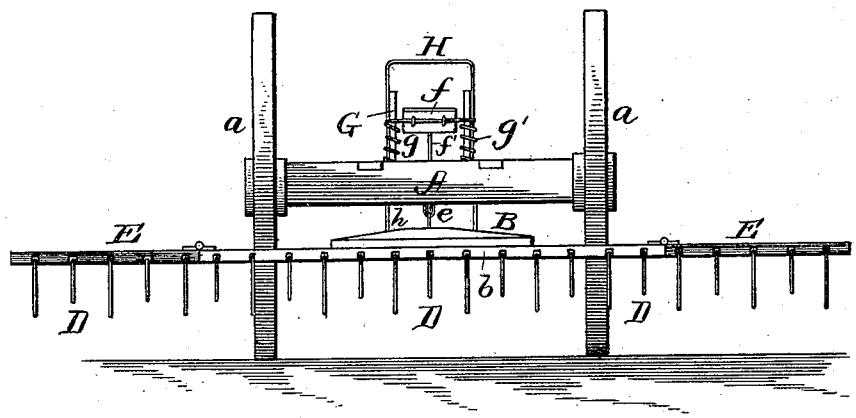
Fig. IV.
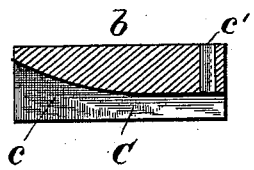
Witnesses:
J. B. McGirr.
William O. Belt.
Inventor:
Zephamah Breed,
By his attorneys
Edson Bro's.
THE NORRIS PETERS CO., PHOTO-LITHO., WASHINGTON, D. C.

UNITED STATES PATENT OFFICE.

ZEPHANIAH BREED, OF NORTH WEARE, NEW HAMPSHIRE.

SULKY CULTIVATOR AND WEEDER.

SPECIFICATION forming part of Letters Patent No. 473,289, dated April 19, 1892.

Application filed July 22, 1891. Serial No. 400,324. (No model.)

*To all whom it may concern:*

Be it known that I, ZEPHANIAH BREED, a citizen of the United States, residing at North Weare, in the county of Hillsborough and State of New Hampshire, have invented certain new and useful Improvements in Sulky Cultivators and Weeders; and I do hereby declare the following to be a full, clear, and exact description of the invention, such as will enable others skilled in the art to which it appertains to make and use the same.

My present invention relates to improvements in sulky cultivators and weeders; and the object is to provide, first, a novel arrangement and adaptation of parts to enable the operator to ride on the machine and manipulate it properly; second, to provide suitable devices in connection with the seat to regulate the play of the weeder or cultivator, and, third, to provide means for enlarging the weeder or cultivator at will.

With these ends in view my invention contemplates the use of suitable carrying-wheels mounted on an axle, from which a tongue or shafts project.

The weeder or cultivator comprises a number of teeth fixed in a suitable head, which is secured in a frame bolted to a rocker, which is loosely swiveled to the axle underneath the frame, extending forwardly to form a platform or foot-rest beneath the operator. The operator can sit on a seat, which is pivotally secured on a cross-piece loosely operating on two uprights fixed on the axle, and the front part of the seat is connected by a rope or chain to the under side of the platform on the forward end of the weeder and cultivator, by means of which the operator can adjust the fingers or teeth to have greater or less contact with the ground by simply tilting the seat. A lever is pivoted between the shafts, and by simply elevating the handle thereof until the ends engage with the platform the weeder-teeth can be elevated above the ground. Suitable extension-pieces are pivotally secured on either end of the weeder-head, which can be thrown over to enlarge the weeder, if desired.

My invention further consists of certain details of construction and arrangement of parts, which will be fully described hereinafter.

To enable others to more readily understand my invention, I have illustrated the same in the accompanying drawings, in which—

Figure I is a top plan view of my improved weeder and cultivator. Fig. II is a side elevation with one of the carrying-wheels removed and the weeder or cultivator in an elevated position. Fig. III is a rear elevation; and Fig. IV is a transverse sectional view through the weeder-head, showing the oval slot therein.

Referring to the drawings, in which like letters of reference denote corresponding parts in all the figures, A designates the main axle of the machine, which carries the supporting-wheels $a$ and the shafts $a'$, or a tongue may be used in lieu of the shafts, as desired.

The weeder or cultivator consists of a suitable frame B, which carries a head-piece $b$ on its rear end, and the head-piece is preferably arranged to project beyond the wheels $a$. The head-piece is provided with a series of slots C in its under side, which are beveled off at $c$ at the rear side of the head-piece to form an oval-shaped slot, and a hole $c'$ is provided near the front end to receive the upturned end $d$ of the teeth or fingers D. By this arrangement it will be readily seen that the teeth can be easily and quickly inserted and fastened in place, and also easily removed when the operator wishes only to cultivate between rows, and that there is no danger of the teeth becoming displaced, because the inner ends thereof are wholly inclosed within the slot, where they engage with the head, and the peculiar construction of the slot permits a limited movement of the teeth upward in said slots, getting relief from obstruction without being "set" or bent, as they would if there was a direct pressure on them without permitting them to get out of their proper normal positions. The head-piece $b$ may be of any suitable length desired; but I provide extensions E, which are hinged to the ends of the rigid portion $b$ and may be thrown back on said rigid portion when they are not in use and extended when desired. When the extensions are used, I may provide a tongue in place of the shafts and use two horses.

The frame C is pivotally secured underneath of the axle A by a swivel-joint $e$ at the middle of the rocker in order that the weeder and cultivator may have an independent motion from the carrying-wheels and the tongue, and also to give it a free movement to adapt it to different elevations of the ground. The front part of the frame B is provided with a platform F, on which the operator places his feet.

Secured in the axle A and projecting upward therefrom, parallel to each other, are two upright posts G, and a cross-piece $g$, having its ends bent to form springs $g'$, is loosely secured on these uprights by slipping the springs over said uprights. The operator's seat $f$ is pivotally secured on the cross-piece $g$ between the uprights G, and it is connected at its forward end to the under side of the platform by a rope or chain $f'$. By this arrangement the operator can readily adjust the pressure of the teeth of the weeder and cultivator on the ground, and this is accomplished by simply leaning forward or backward in the seat, thus depressing the platform with his feet or elevating the platform by means of the rope or chain attached thereto.

In order to elevate the weeder above the ground to move it about when not in use, I provide a bifurcated lever H, which is pivotally secured at $h$ on the inner side of either shaft, and the forward ends thereof are bent downward to form hooks $h'$, which are adapted to engage with cleats I on the platform when the handle $i$ is elevated, and thereby hold the weeder above the ground.

As shown in Fig. II, the seat is tilted forward somewhat when the teeth are held in an elevated position by the lever H engaging with the cleats I; but when this lever is disengaged from the cleats on the platform the operator may throw his weight on the rear part of the seat to elevate the front part of the frame by means of the rope $f'$, connecting the seat with the platform, and by tilting the seat more or less the depth of penetration of the teeth is regulated.

I am aware that changes in the form and proportion of parts and details of construction can be made without departing from the spirit or sacrificing the advantages of my invention, and I therefore reserve the right to make such changes as fall within the scope of my invention.

Having thus described my invention, what I claim as new, and desire to secure by Letters Patent, is—

1. The herein-described sulky cultivator and weeder, comprising the main axle, the carrying-wheels, the frame loosely swiveled to said axle, the head-piece, the teeth fixed in said head-piece, the pivoted seat, and a connection intermediate of the seat and the forward part of the frame, substantially as described.

2. In a sulky cultivator and weeder, the carrying-wheels, the axle, the uprights on said axle, the cross-piece having the spring ends operating loosely on the uprights, and the seat pivoted on said cross-piece, substantially as described.

3. In a sulky cultivator and weeder, the carrying-wheels, the axle, the frame supporting the weeder, loosely secured to said axle, the platform on the forward part of the frame, the uprights on said axle, the cross-piece, the seat pivoted on said cross-piece, and a connection between the seat and the platform, substantially as described.

4. In a sulky cultivator and weeder, the carrying-wheels, the axle, the weeder-frame pivoted to the under side of said axle, the platform on the frame, and the lever pivoted on the shafts and adapted to engage with the platform to elevate the weeder, substantially as described.

5. In a sulky cultivator and weeder, the combination of the carrying-wheels, the axle, the frame B, the platform F, the seat pivoted between the uprights on the axle and adapted to raise and lower the platform as it is tilted, and the head-piece $b$, secured on the frame, the teeth fitted in said head-piece, and the extensions E, hinged to the ends of said head-piece and adapted to fold over on the same, substantially as described.

In testimony whereof I affix my signature in presence of two witnesses.

ZEPHANIAH BREED.

Witnesses:
O. E. BRANCH,
H. A. PAGE.